United States Patent

Hogel et al.

[15] 3,638,857

[45] Feb. 1, 1972

[54] PRESSURE DISCRIMINATOR

[72] Inventors: Joseph E. Hogel, River Grove; Donald H. Spethmann, Arlington Heights, both of Ill.

[73] Assignee: Honeywell, Inc., Minneapolis, Minn.

[22] Filed: May 6, 1970

[21] Appl. No.: 34,944

[52] U.S. Cl..............................236/1 B, 137/85
[51] Int. Cl..........................................F24f 11/08
[58] Field of Search...............236/1 B, 82; 137/111, 85

[56] References Cited

UNITED STATES PATENTS

| 2,295,149 | 9/1942 | Adams et al. | 236/1 B |
| 2,778,372 | 1/1957 | Jaquith | 137/111 |
| 3,223,105 | 12/1965 | Hogel | 137/85 |

*Primary Examiner*—William E. Wayner
*Attorney*—Lamont B. Koontz

[57] ABSTRACT

A pneumatic pressure responsive apparatus utilizing diaphragm logic which selects and transmits the lowest pressure of a plurality of input pressures.

5 Claims, 3 Drawing Figures

PATENTED FEB 1 1972

3,638,857

INVENTOR.
JOSEPH E. HOGEL
DONALD H. SPETHMANN
BY
ATTORNEY.

PRESSURE DISCRIMINATOR

BACKGROUND OF THE INVENTION

This invention relates to a pneumatic pressure responsive apparatus which discriminates between a plurality of input pressures. More particularly this invention relates to a pressure responsive apparatus which selectively transmits the lowest pressure of a plurality of input pressures.

This pressure discriminator is of the type which is used in a control system wherein one seeks to optimally control a condition or conditions in a number of regions, zones, or the like. This optimal control is attained by determining which region deviates the most from its desired state. Corrective measures are instituted to return the region to its desired state in accordance with the magnitude of the deviation from its desired state as established by the pressure discriminator.

This invention is generally of the type of pressure responsive apparatus disclosed in Jacquith U.S. Pat. No. 2,778,372 which discloses the selection of the lowest or the highest of only two pressures. Many such prior art devices enable one to so discriminate between two pressures. The instant invention, however, allows one to select the lowest pressure from many pressures, the number limited only by practicality. Prior art devices either had to be stacked to perform this function or required complex check valve arrangements. In a stacking arrangement, one device compares two pressures the lowest of which is selected. That pressure is then compared with a third pressure and the lowest of these two pressures is selected and so forth. The instant invention eliminates this stacking as well as check valving and provides an inexpensive, compact, reliable and adaptable apparatus which provides a low-pressure selection function. In addition the instant invention provides dead-ended input pressure chambers which preclude undesirable airflow in control lines.

SUMMARY OF THE INVENTION

The subject invention utilizes individual valve means or diaphragm modules to accomplish the low-pressure selection function. Each module is comprised of a housing divided by a diaphragm into a first and second chamber. A centrally disposed passage forming partition or valve seat means in the second chamber defines a third chamber. The partition coacts with the diaphragm to allow or disallow communication between the second and third chambers. The first chambers of each of the modules communicate with one of the sources of pressure, the lowest of which is to be selected. All of the second chambers of the modules are connected in parallel and communicate with a source of regulated pressure and output means. All of the third chambers of the modules exhaust to the atmosphere or otherwise as desired.

BRIEF DESCRIPTION OF THE DRAWING

Further advantages of the subject invention will become apparent in the following detailed description and the drawing wherein.

DESCRIPTION OF THE PREFERRED EMBODIMENT

In the following detailed description it will be assumed that the pressure discriminator will be used in a pneumatic air-conditioning control system wherein air temperature or relative humidity or the like is controlled. This is done only in order that the function of the subject invention may be better clarified and is not, of course, intended to limit the scope of the invention in any way.

Figure 1:
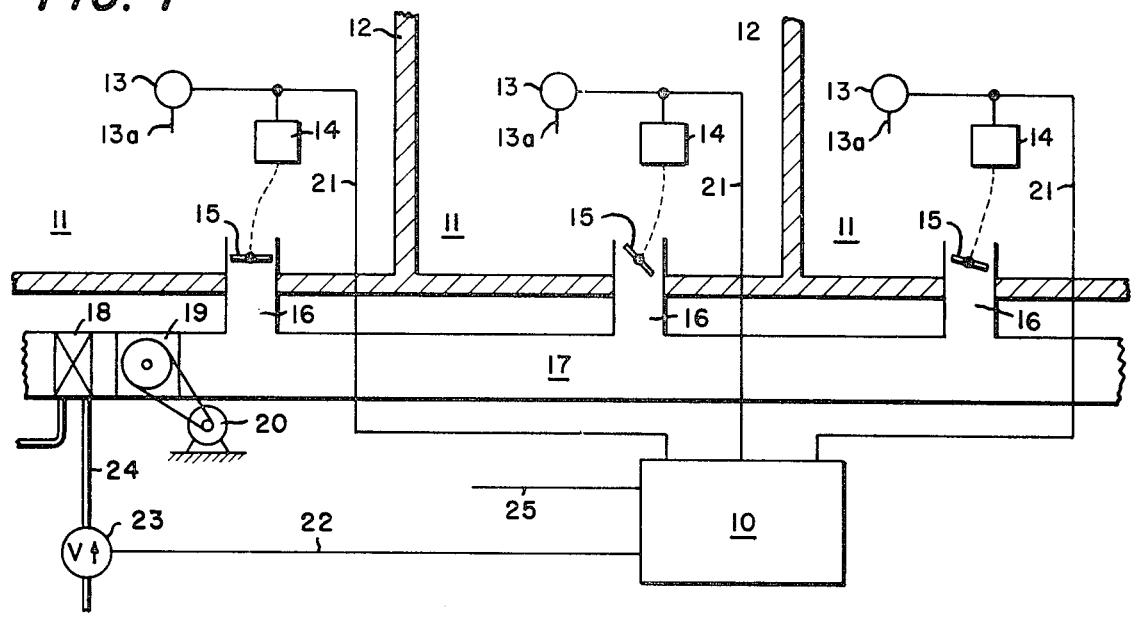
FIG. 1 is a schematic illustration of a pneumatic control system in which the low-pressure selection function may be utilized.

In FIG. 1 the pressure discriminator or pressure selector 10 is shown in a pneumatic air-conditioning control system having three regions or zones 11 separated by partitions 12. In each region is a condition responsive device 13 such as a thermostat or a humidistat, communicating with a damper motor 14. Condition responsive devices 13 are connected via piping 13a to a source of regulated air pressure not shown. The damper motor controls a damper 15 which controls the volume of airflow through a passageway 16 communicating with a duct 17. In the duct is located a coil 18 or the like and a fan 19 driven by a motor 20. The condition responsive device 13 in each zone is in communication with the pressure selector 10 via piping or branch lines 21. The lowest pressure in the three branch lines is determined and selected by the pressure selector and is in turn communicated through piping 22 to the valve 23 or to the set point of a discharge controller which in turn positions valve 23 which delivers an appropriate amount of condition-changing medium through piping 24 to coil 18. Connected to the pressure selector through piping 25 is a source of regulated air pressure not shown.

Figure 2:
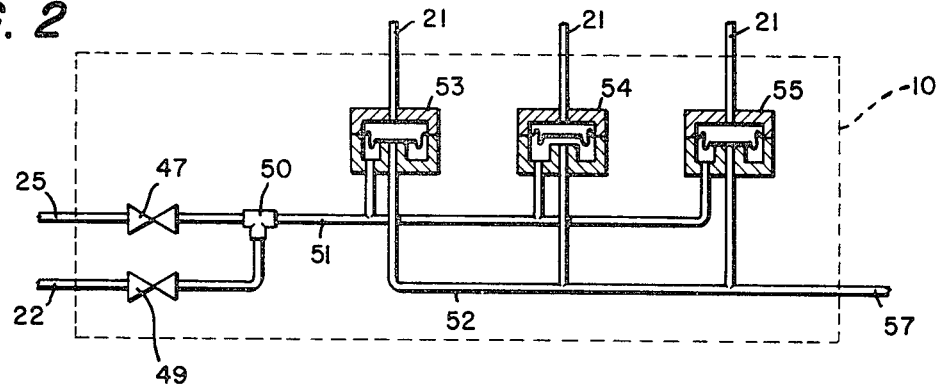
FIG. 2 is a schematic of diaphragm modules interconnected to provide a low-pressure selection function.
Figure 3:
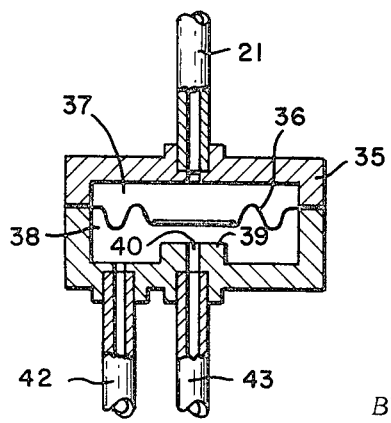
FIG. 3 is an enlarged view of a single diaphragm module.

FIG. 2 is a schematic of three diaphragm modules which perform a low-pressure selection function in the system depicted in FIG. 1. Diaphragm modules 53, 54 and 55 are connected through piping 21 to the various zones as illustrated in FIG. 1. As shown in FIG. 3, each diaphragm module is comprised of a housing 35 and a diaphragm 36 dividing the housing into a control chamber 37 and an inlet chamber or flow chamber 38. Centrally disposed within the inlet chamber is an annular partition or the like 39 which defines an outlet chamber or valving chamber 40. The partition means 39 is designed to operate in a sealable relation with the diaphragm 36. As noted above piping 21 communicates with control chambers 37. It is important to note that the control chambers 37 are dead ended; i.e., that there is no flow of fluid through piping 21. This feature, unlike many bleed-type pressure selectors, precludes any effect the pressure selector may ordinarily have on the control by the thermostat 13 of the damper motor 14.

Connection means 42 provides communication between inlet chamber 38 and piping 51. Connection means 43 provides communication between outlet chamber 40 and piping 52. Piping 51 connects in parallel the inlet chambers 38 of each of the diaphragm modules. Piping 52 connects in parallel each of the outlet chambers 40 of the three diaphragm modules and in addition provides an exhaust means or exhaust function at 57. Obviously each of the chambers 40 may exhaust directly to the atmosphere thereby making unnecessary piping 52. Completing the structure is piping 25 leading to a supply of regulated air pressure, not shown, which pressure is equal to or greater than the highest input pressure to be received by any of the diaphragm modules. Included in piping 25 is a restriction 47. Downstream of restriction 47 is connection 50 to which piping 22 including a restriction 49 is connected. Piping 22 provides an output pressure which corresponds and is equal to the lowest of the plurality of input pressures. While the restriction 49 is illustrated, it is necessary on only certain applications of the apparatus. While diaphragm modules 53, 54 and 55 are shown to be separate units, it should be noted that their construction is such as to be readily adaptable to assembly in a unitary diaphragm logic assembly or package as is suggested by Stucki U.S. Pat. No. 2,897,834. In operation, if the lowest of the input pressures is delivered to module 54, the diaphragm 36 will modulate so as to equalize the pressure in control chamber 37 of module 54 and inlet chamber or flow chamber 38 of module 54. This modulation will bleed off, through the outlet chamber or valving chamber of module 54, the excess pressure through piping 52 and out exhaust 57. As noted earlier the source of regulated air pressure connected at 25 must provide a pressure equal to or greater than the highest input pressure to be received. Since the pressure applied to modules 53 and 55 are greater than the pressure applied to module 54, the diaphragms 36 in modules 53 and 55 will be held closed and accordingly will have no effect on the output pressure through piping 22.

While the subject invention has been described within the context of a pneumatic air-conditioning control system wherein air temperature or humidity is controlled, it is not intended that the scope of the invention claimed be limited by anything but the appended claims.

The embodiments of the invention in which an exclusive property or right is claimed are defined as follows:

1. Pressure responsive apparatus comprising:
   at least three diaphragm modules each comprising housing means,
   diaphragm means dividing the housing means into a control chamber and a flow chamber,
   partition means disposed within the flow chamber and arranged to sealably cooperate with the diaphragm means to further define a valving chamber;
   conduit means interconnecting each of the flow chambers of the diaphragm modules;
   inlet means including a restriction adapted to be connected to a source of regulated pressure and connected to the conduit means;
   outlet means connected to the inlet means downstream of the restriction;
   exhaust means connected to each of the valving chambers of the diaphragm modules;
   each of the control chambers of the diaphragm modules being adapted to receive an input pressure signal, the pressure responsive apparatus providing an output pressure signal at the outlet means substantially equal to the lowest of the input pressure signals.

2. Pressure responsive apparatus according to claim 1 wherein the exhaust means comprises conduit means interconnecting each of the valving chambers of the diaphragm modules thereby providing a single exhaust for all of the diaphragm modules.

3. Pressure responsive apparatus according to claim 2 wherein the outlet means includes a restriction.

4. Pressure responsive apparatus according to claim 1 in combination with a system for optimally controlling a physical condition in a plurality of regions, each of the regions have a condition responsive device, wherein:
   sets of said condition responsive devices and said control chambers of said diaphragm modules are interconnected; and,
   said output means is in communication with means capable of affecting a change in said physical condition, whereby the condition-changing capability of said means is varied in accordance with the demand for such variation in a zone of greatest deviation.

5. Pressure responsive apparatus according to claim 3 in combination with a system for optimally controlling a physical condition in a plurality of zones, each of the zones having a condition responsive device, wherein:
   sets of said condition responsive devices and said control chambers of said plurality of diaphragm modules are interconnected; and,
   said output means is a communication with means capable of affecting a change in said physical condition, whereby the condition-changing capability of said means is varied in accordance with the demand for such variation in a zone of greatest deviation.

* * * * *